US011484947B2

(12) United States Patent
Shinohara et al.

(10) Patent No.: US 11,484,947 B2
(45) Date of Patent: Nov. 1, 2022

(54) MACHINE TOOL

(71) Applicants: CITIZEN WATCH CO., LTD., Nishitokyo (JP); CITIZEN MACHINERY CO., LTD., Nagano (JP)

(72) Inventors: Takanori Shinohara, Saku (JP); Mitsuru Yamaura, Ueda (JP)

(73) Assignees: Citizen Watch Co., Ltd., Tokyo (JP); Citizen Machinery Co., Ltd., Nagano (JP)

( * ) Notice: Subject to any disclaimer, the term of this patent is extended or adjusted under 35 U.S.C. 154(b) by 402 days.

(21) Appl. No.: 16/645,936

(22) PCT Filed: Sep. 10, 2018

(86) PCT No.: PCT/JP2018/033431
§ 371 (c)(1),
(2) Date: Mar. 10, 2020

(87) PCT Pub. No.: WO2019/054329
PCT Pub. Date: Mar. 21, 2019

(65) Prior Publication Data
US 2020/0198016 A1    Jun. 25, 2020

(30) Foreign Application Priority Data
Sep. 12, 2017   (JP) .............................. JP2017-174455

(51) Int. Cl.
*B23B 3/30*     (2006.01)
*G05B 19/402*   (2006.01)

(52) U.S. Cl.
CPC .............. *B23B 3/30* (2013.01); *G05B 19/402* (2013.01); *G05B 2219/37407* (2013.01)

(58) Field of Classification Search
CPC ................................ B23B 3/30; G05B 19/402
See application file for complete search history.

(56) References Cited

U.S. PATENT DOCUMENTS

| 4,071,896 A | 1/1978 | Boyer, III et al. |
| 4,592,259 A | 6/1986 | Goemer et al. |
(Continued)

FOREIGN PATENT DOCUMENTS

| CN | 100478122 C | 4/2009 |
| CN | 102804088 A | 11/2012 |
(Continued)

OTHER PUBLICATIONS

Japanese Office Action for Application No. 2019-542042, dated Mar. 8, 2022, in 2 pages.
(Continued)

*Primary Examiner* — Mark A Connolly
(74) *Attorney, Agent, or Firm* — Knobbe, Martens, Olson & Bear, LLP

(57) ABSTRACT

A machine tool includes a spindle headstock having a main spindle, a spindle headstock having a main spindle with a Z3 axis parallel to an axis center direction of the main spindle, a turret that moves relative to the spindle headstocks, and a controller that superposition-controls the spindle headstock with movement of the turret as a standard, wherein the turret is movable in directions of an X axis and a Ys axis that are orthogonal to a Z axis and intersect with the Z axis at an angle except for the right angle, and the controller moves the turret in a direction of a Y axis different from the Ys axis and the X axis by combining movement in the direction of the Ys axis and movement in the direction of the Y axis, and regulates, in the superposition control, the movement of the spindle headstock in the X axis direction associated with the movement in the Y axis direction.

6 Claims, 3 Drawing Sheets

(56) References Cited

U.S. PATENT DOCUMENTS

| | | |
|---|---|---|
| 5,977,736 A | 11/1999 | Nakazato |
| 6,971,294 B1 | 12/2005 | Shinohara et al. |
| 2016/0291567 A1 | 10/2016 | Rivers et al. |

FOREIGN PATENT DOCUMENTS

| | | | |
|---|---|---|---|
| CN | 104081300 A | | 10/2014 |
| EP | 851328 A1 | | 7/1998 |
| EP | 1275454 A1 | | 1/2003 |
| JP | 2-181203 A | | 7/1990 |
| JP | H05138402 A | * | 11/1991 |
| JP | 5-138402 A | | 6/1993 |
| JP | 10-27013 A | | 1/1998 |
| JP | 2800124 B2 | | 9/1998 |
| JP | 11-110019 A | | 4/1999 |
| JP | 2002205202 A | | 7/2002 |
| JP | 2008-279570 A | | 11/2008 |
| JP | 4677062 B | | 2/2011 |
| WO | 98/001796 A1 | | 1/1998 |

OTHER PUBLICATIONS

Supplementary European Search Report for EP 18855482 dated Mar. 15, 2021.
Taiwanese Decision to Grant for Application No. 107131977, dated May 3, 2022, in 4 pages.

\* cited by examiner

__(2)__

MACHINE TOOL

CROSS-REFERENCE TO RELATED APPLICATION

The present application is a national stage application of PCT Application No. PCT/JP2018/033431, filed on Sep. 10, 2018, which claims priority to Japanese Patent Application No. 2017-174455, filed on Sep. 12, 2017, the disclosures of which are hereby incorporated by reference in their entirety.

TECHNICAL FIELD

This disclosure relates to a machine tool.

BACKGROUND ART

In a machine tool such as an automatic lathe that machines an object to be machined, and includes a plurality of spindle headstocks, a spindle headstock is moved by superposition control in accordance with movement of a tool post that machines an object to be machined, which is held by a main spindle of a predetermined spindle headstock, with a tool, so as to simultaneously machine an object to be machined, which is held by the spindle headstock, with the tool of the tool post (see JP2800124B, for example).

SUMMARY

On the other hand, when the tool post is movable along an X axis (for example, horizontal direction) and an inclined Y axis (Ys axis), which is inclined relative to the X axis and intersects with the X axis without being orthogonal to the X axis, it is necessary to combine the movement in the X axis direction and the movement in the Ys axis direction, in order to move the tool post in a Y axis direction (for example, vertical direction) orthogonal to the X axis direction.

However, with the above superposition control, the tool post is moved in the X axis direction along with the movement of the tool posit in the Y axis direction, resulting in the movement of the spindle headstock to be superposition-controlled in the X axis direction. As the spindle headstock moves in the X axis direction under the superposition control, the positional relationship between the tool post and the spindle headstock may not be maintained appropriately.

The present disclosure has been made in view of the above circumstances, and an object of the present disclosure is to provide a machine tool that includes a movement axis in the X axis direction and a movement axis in a direction inclined but not orthogonal to the X axis, and regulates the movement of the spindle headstock in the superposition control when the tool post is moved in the Y axis direction due to the combination of both of the movement axis.

The present disclosure provides a machine tool including a spindle headstock movable in an X axis direction, a tool post that includes a movement axis in the X axis direction and a movement axis in a direction inclined to the X axis direction to intersect therewith, and is movable relative to the spindle headstock, and a controller that performs superposition control of movement of the tool post and movement of the spindle headstock. The tool post is movable in a Y axis direction orthogonal to the X axis by combining movement along the two movement axes. The controller includes a regulator that regulates movement of the spindle headstock in the superposition control associated with movement of the tool post in the Y axis direction.

DETAILED DESCRIPTION

Figure 1:
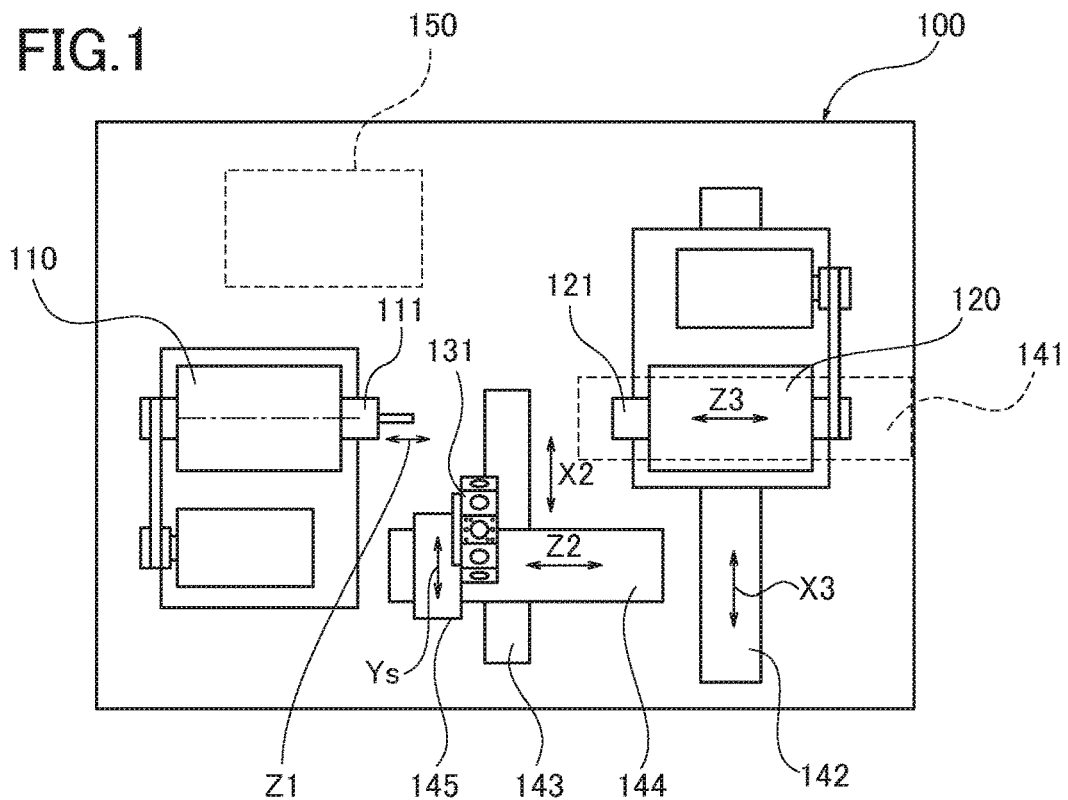
FIG. 1 is a plan view illustrating a machine tool as one embodiment of the present disclosure.

Hereinafter, an embodiment of a machine tool according to the present disclosure is described. FIG. 1 is a plan view illustrating a machine tool 100 as one embodiment of the present disclosure. The machine tool 100 is an NC automatic lathe, and includes two main spindles 111, 121 as illustrated in FIG. 1. One main spindle 111 (hereinafter referred to as first main spindle 111) is provided in a fixed spindle headstock 110. The first main spindle 111 holds, for example, a rod like workpiece (object to be machined) to be feedable in an axis center direction of the first main spindle 111.

The other main spindle 121 (hereinafter, referred to as second main spindle 121) is provided in a spindle headstock 120 to face the first main spindle 111. The second main spindle 121 is arranged such that its Z3 axis as an axis center direction becomes parallel to an axis center direction (Z1 axis) of the first main spindle 111. The spindle headstock 120 is provided to be movable in the Z3 axis direction and in a horizontal direction (X3 axis direction) orthogonal to the Z3 axis.

The machine tool 100 includes a Z3 axis moving device 141 that moves the spindle headstock 120 in the Z3 axis direction and an X3 axis moving device 142 that moves the spindle headstock 120 in the X3 axis direction. Each of the Z3 axis moving device 141 and the X3 axis moving device 142 includes an electric motor and a ball screw that rotates in synchronization with rotation of an axis of the electric motor. The ball screws extend in the Z3 axis direction and the X3 axis direction, respectively.

Figure 2:
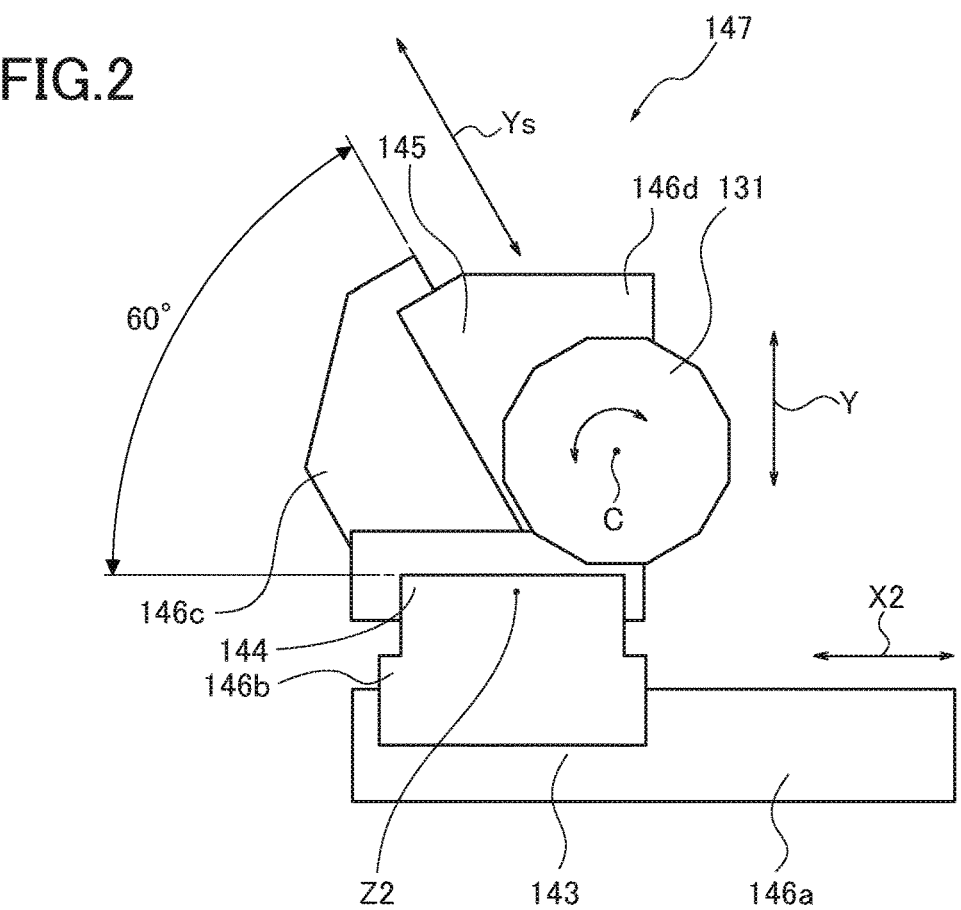
FIG. 2 is a side view of a turret in a Z3 axis direction.

A turret tool post 131 (hereinafter referred to as turret 131) is provided between the first main spindle 111 and the second main spindle 121 to be rotatable about an axis C and to be freely positioned. In the turret 131, a plurality of turret surfaces (in present embodiment, twelve turret surfaces as one example) provided in a circumference surface about the axis C hold tools such as bytes and drills. As illustrated in FIG. 2, the turret 131 is provided to be movable with respect to the first main spindle 111 and the second main spindle 121 with a turret moving device 147.

The turret moving device 147 includes a rail 146a extending in an X2 axis direction parallel to the X3 axis, a base 146b movable in the X2 axis direction on the rail 146a, a middle base 146c movable in a Z2 axis direction parallel to a Z1 axis on the base 146b, and a supporting base 146d movable in a Ys axis direction, which is orthogonal to the Z2 axis and is not orthogonal to the X2 axis, on the middle base 146c. The turret 131 is provided in the supporting base 146d to be rotatable about the axis C parallel to the Z2 axis. In addition, the Ys axis extends in a direction inclined relative to the Y axis direction as the vertical direction orthogonal to the Z2 axis, inclines in the X axis direction, and intersects with the X axis.

The turret moving device 147 also includes an X2 axis moving device 143 that moves the turret 131 in the X2 axis direction, a Z2 axis moving device 144 that moves the turret 131 in the Z2 axis direction, and a Ys axis moving device 145 that moves the turret 131 in the Ys axis direction. Accordingly, the turret 131 includes three movement axes in the Z2 axis direction, the X2 axis direction, and the Ys axis direction, and is movable relative to the spindle headstocks 110, 120 along each movement axis. Each of the X2 axis moving device 143, the Z2 axis moving device 144, and the Ys axis moving device 145 includes an electric motor and a ball screw that rotates in synchronization with rotation of an axis of the electric motor. The ball screws extend in the X2 axis direction, the Z2 axis direction, and the Ys axis direction, respectively.

The Z2 axis moving device 144 is placed on the base 146b that is moved in the X2 axis direction by the X2 axis moving device 143, and the Ys axis moving device 145 is placed on the middle base 146c that is moved in the Z2 axis direction by the Z2 axis moving device 144. The turret 131 is placed on the supporting base 146d that is moved in the Ys axis direction by the Ys axis moving device 145.

The machine tool 100 also includes a controller 150 that controls the respective operations of the Z3 axis moving device 141, the X3 axis moving device 142, the X2 axis moving device 143, the Z2 axis moving device 144, and the Ys axis moving device 145 in addition to the rotation of the turret 131. Similar to the conventional one, the controller 150 turns the turret 131 in a predetermined rotation position, and moves the second main spindle 121 and the turret 131 in specific positions.

In the machine tool 100, the controller 150 turns the turret 131 about the axis C, selects the tool held on a specific turret surface, and moves the second main spindle 121 and the turret 131 in specific positions. The workpiece held by the first main spindle 111 and the workpiece held by the second main spindle 121 can be thereby machined by the selected tool.

The turret 131 is equipped with a tool that machines the workpiece held by the first main spindle 111 and a tool that machines the workpiece held by the second main spindle 121. Both of the tools can be arranged such that one of the tools is selected relative to the second main spindle 121 or the first main spindle 111 by selecting the other tool relative to the corresponding first main spindle 111 or second main spindle 121 by the rotation of the turret 131.

In the machine tool 100, the workpiece held by the first main spindle 111 and the workpiece held by the second main spindle 121 can be simultaneously machined by performing the superposition control to the movement of the second main spindle 121 and the movement of the turret 131 with the controller 150 when the controller 150 controls the movement of the turret 131 for performing preset machining to the workpiece held by the first main spindle 111.

Figure 3:
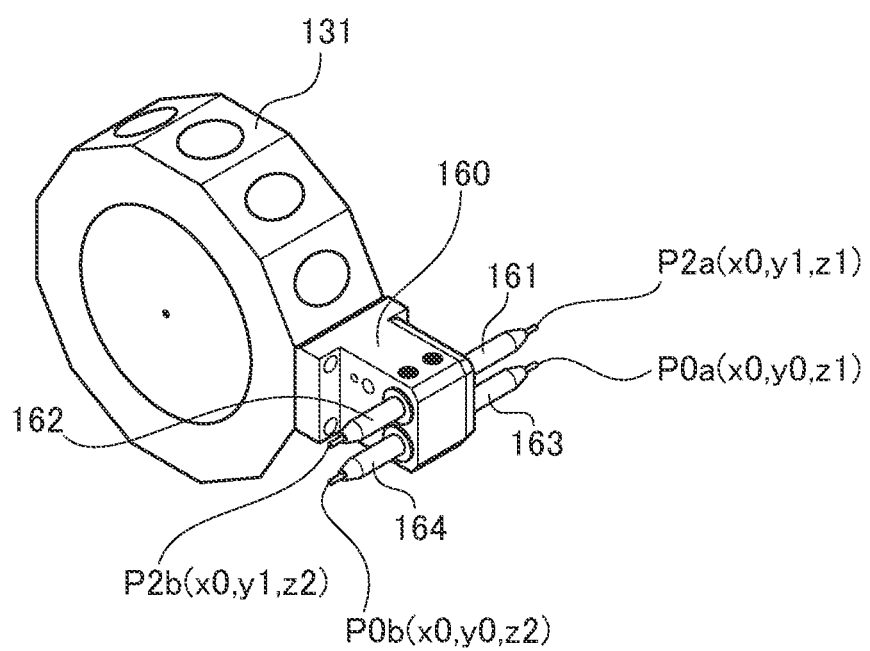
FIG. 3 is a perspective view illustrating the turret to which a tool holder equipped with tools is attached.
Figure 3:
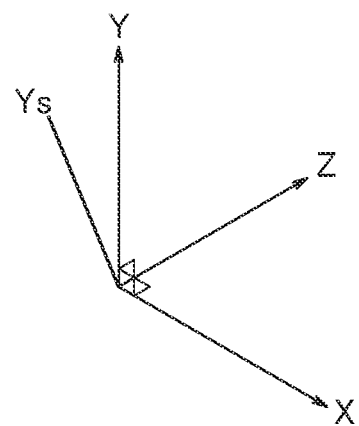

The turret 131 is equipped with each tool through a tool holder 160. For example, as illustrated in FIG. 3, the tool holder 160 is equipped with the tools 161, 163 that machine the workpiece of the first main spindle 111, and also is equipped with the tools 162, 164 that machine the workpiece of the second main spindle 121.

In the present embodiment, tool edges of the tools 161, 162 and tool edges of the tools 163, 164 are the same in positions in the X axis direction (direction parallel to X2 axis and X3 axis) and in the Y axis direction, and differ in positions in the Z axis direction (direction parallel to Z2 axis and Z3 axis). The tool edge of the tool 163 relative to the tool edge of the tool 161 and the tool edge of the tool 164 relative to the tool edge of the tool 162 are the same in positions in the X axis direction, and differ in positions in the Y axis direction.

When the tool 161 is switched with the tool 163 while the superposition control is maintained, the turret 131 moves the tool edge of the tool 163 to a position P2a of the tool edge of the tool 161.

The tool 161 can be switched with the tool 163 by moving the turret 131 in the Y axis direction. The tool 162 is switched with the tool 164 by switching the tool 161 with the tool 163. The turret 131 is moved in the Y axis direction by combining the movement in the Ys axis direction with the Ys axis moving device 145 and the movement in the X2 axis direction with the X2 axis moving device 143.

When the turret 131 is moved in the Y axis direction, the X2 axis moving device 143 operates according to the operation of the Ys axis moving device 145, and the turret 131 is moved in the X2 axis direction. When the turret 131 is moved in the Y axis direction while the superposition control is maintained, the controller 150 regulates the movement of the second main spindle 121 with the X3 axis moving device 142, which corresponds to the operation of the X2 axis moving device 143, associated with the movement of the turret 131 in the Y axis direction according to the superposition control.

As a result, even though the machining with the tools 161, 163 arranged in the Y axis direction are switched, and the machining with the tools 162, 164 are switched, the X3 axis moving device does not follow the movement of the turret 131 in that switching. The second main spindle 121 is thereby prevented from being displaced to the tool 163 switched to be arranged in a new reference position, and the second man spindle 121 can be appropriately moved in the superposition control. Accordingly, the controller 150 operates as a regulator that regulates the movement of the spindle headstock 120 in the superposition control, which corresponds to the movement of the turret 131 in the X axis direction associated with the movement of the turret 131 in the Y axis direction.

When the controller 150 operates as the regulator to move the turret 131 in the Y axis direction, the second main spindle 121 in the superposition control can be moved with the coordinate position of the turret 131 in the X axis direction as the reference. As the tool edge of the tool 164 is previously positioned to the turret 131, the position of the tool edge of the tool 164 mounted on the turret 131 is set to the reference position of the movement of the second main spindle 121 in the superposition control. By setting the reference position for the superposition control to the position of the tool edge of the tool 164, the movement of the second main spindle 121 associated with the movement of the turret 131 in the Y axis direction can be simply regulated in the superposition control.

When the controller 150 operates as the regulator, the movement amount (distance and coordinate) of the second main spindle 121 in the direction opposite to the direction of the movement of the second main spindle 121 in the X axis direction in the superposition control in response to the movement of the turret 131 in the Y axis direction is added to the movement amount of the second main spindle 121 in the X axis direction in the superposition control, so as to regulate the movement of the second main spindle 121. In this case, such control is a process inside the controller 150, and can be achieved by the same process as the relative movement of the second main spindle 121 to the turret 131 for machining.

A time constant of the moving device for each axis in the machine tool 100 is preset to a small value (minimum value) for quickly moving the moving device. A time constant $T^{X2}$ of the X2 axis direction is set to be smaller than a time constant $T^{Ys}$ of the Ys axis direction, and a constant moving velocity VX2 in the X2 axis direction is set to be larger than a constant moving velocity VYs.

The time constant $T^{X2}$ in the movement in the X2 axis direction with the X2 axis moving device 143 is meant to be a time in which the moving velocity of the turret 131 in the X2 axis direction reaches the constant moving velocity VX2 from 0. The smaller the time constant $T^{X2}$, the shorter the time required to reach the constant moving velocity VX2. The larger the time constant $T^{X2}$, the longer the time required to reach the constant moving velocity.

Similarly, the time constant $T^{Ys}$ in the movement in the Ys axis direction with the Ys axis moving device 145 is meant to be a time in which the moving velocity of the turret 131 in the Ys axis direction reaches the constant moving velocity VYs. The smaller the time constant $T^{Ys}$, the shorter the time required to reach the constant moving velocity VYs. The larger the constant time $T^{Ys}$, the longer the time required to reach the constant moving velocity VYs.

Figure 4:
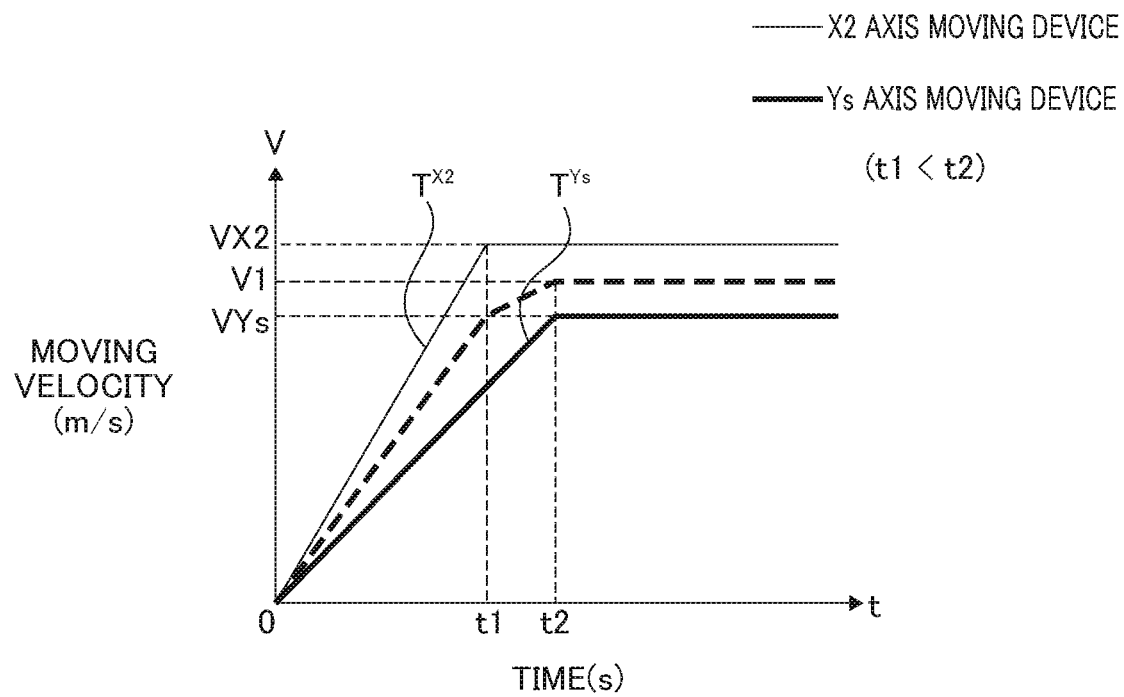
FIG. 4 is a graph showing transitional changes in moving velocity for an X2 axis moving device having a relatively small time constant $T^{X2}$ and a relatively high moving velocity and a Ys axis moving device having a relatively large time constant $T^{Ys}$ and a relatively low moving velocity.

Accordingly, when the X2 axis moving device 143 and the Ys axis moving device 145 are simultaneously operated while maintaining the preset time constants (time constant $T^{X2}$ set to value smaller than time constant $T^{Ys}$), as illustrated in FIG. 4, the moving velocity VX2 in the X2 axis direction with the X2 axis moving device 143 reaches the moving velocity VX2 earlier than the moving velocity VYs in the Ys axis direction with the Ys axis moving device 145 reaches the moving velocity VYs.

The moving velocity VYs in the Ys axis direction reaches the moving velocity VYs later than the moving velocity VX2 in the X2 axis direction reaches the moving velocity VX2. Accordingly, when the two axes are simultaneously operated, the moving velocity in the Y axis direction (shown by thick broken line in FIG. 4) obtained by combining (vector sum) the moving velocity VX2 in the X2 axis direction and the moving velocity VYs in the Ys axis direction increases along with the increase of the moving velocity in the X2 axis direction till a time t1, and reaches a constant moving velocity V1 at a time t2.

In the machine tool 100 of the present embodiment, when the turret 131 is moved in the Y axis direction by combining the movement in the X2 axis direction and the movement in the Ys axis direction, the controller 150 sets the time constants $T^{X2}$, $T^{Ys}$ to the same value, and adjusts both of the moving velocity VX2 in the X2 axis direction with the X2 axis moving device 143 and a X2 axis direction component VYs (X2) of the moving velocity VYs with the Ys axis moving device 145 to have the opposite vectors from each other and the same absolute values. As a result, the movement in the X2 axis direction is cancelled and the turret 131 is moved along the Y axis direction.

More specifically, the time constant $T^{X2}$ is increased to be the same as the time constant $T^{Ys}$, and the moving velocity VX2 in the X2 axis direction with the X2 axis moving device 143 and the X2 axis direction component VYs (X2) of the moving velocity VYs with the Ys axis moving device 145 are adjusted to be the same, such that the movement in the X2 axis direction is cancelled.

Figure 5:
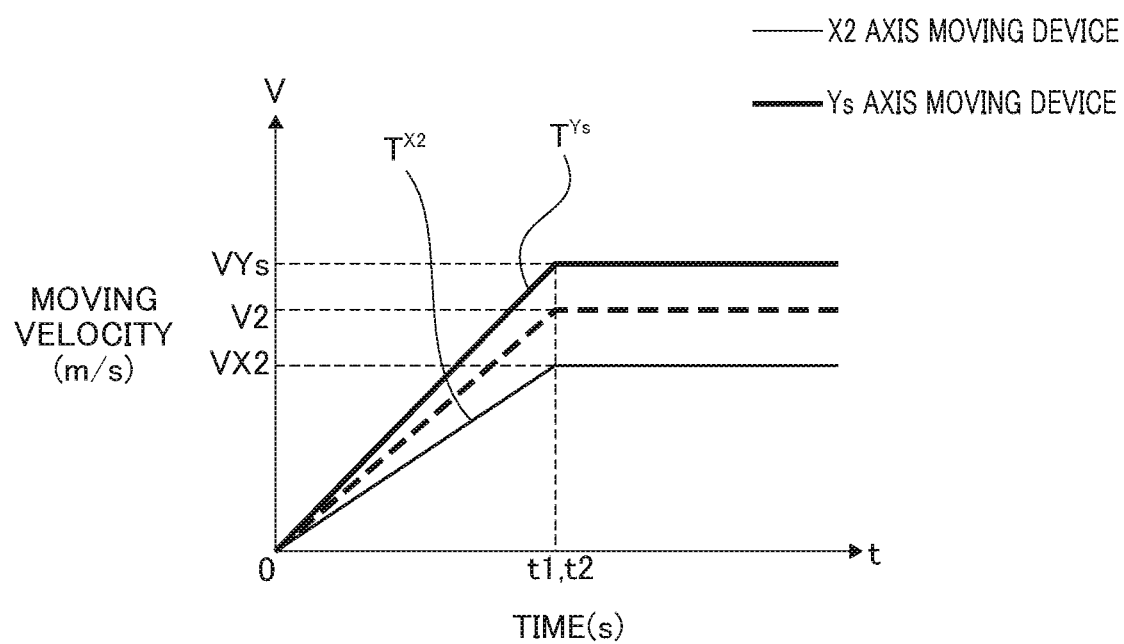
FIG. 5 is a graph showing transitional changes in moving velocity for the X2 axis moving device and the Ys axis moving device when the time constant $T^{X2}$ and the time constant $T^{Ys}$ are set to the same value.

As described above, the two time constants $T^{X2}$, $T^{Ys}$ are set to the same value, and both of the moving velocities of the moving devices 143, 145 for both axes are adjusted, such that the movement in the X2 axis direction is cancelled by the simultaneous movement. Accordingly, when the X2 axis moving device 143 and the Ys axis moving device 145 are simultaneously operated, as illustrated in FIG. 5, the moving velocity VX2 and the moving velocity VYs are reached at the same time of the time t1 and the time t2, and the combination of the movement in the Ys axis direction and the movement in the X2 axis direction achieves the movement along the Y axis direction.

In the machine tool 100 of the present disclosure, when the turret 131 is moved in the Y axis direction by combining the movement in the X2 axis direction and the movement in the Ys axis direction, in a period during which the moving velocity in the Y axis direction reaches a constant moving velocity, the combination of the moving velocity in the Ys axis direction and the moving velocity in the X2 axis direction reaches a constant moving velocity V2 without generating a moving component in the X2 axis direction, so as to achieve the movement along the Y axis direction.

When the controller 150 independently operates the Ys axis moving device 145 and the X2 axis moving device 143 without moving the turret 131 in the Y axis direction, the controller 150 sets the time constant $T^{X2}$ to the minimum time constant $T^{X2}$ to reach the moving velocity VX2 in a short time, so as to quickly move the X2 axis moving device 143.

In the machine tool 100 of the present embodiment, the time constant $T^{X2}$ is set to a value smaller than the time constant $T^{Ys}$. On the other hand, when the time constant $T^{Ys}$ is set to a value smaller than the time constant $T^{X2}$, the controller 150 increases the relatively small time constant $T^{Ys}$ to be the same as the relatively large time constant $T^{X2}$ for moving in the Y axis direction.

Similar to the machine tool 100 of the present embodiment, the time constant $T^{X2}$ in the movement in the X2 axis direction and the time constant $T^{Ys}$ in the movement in the Ys axis direction, and the moving velocity VX2 in the X2 axis direction and the moving velocity VYs in the Ys axis direction can be switched according to a type of machining, in addition to the operation which moves the turret 131 in the Y axis direction.

For example, in turning, the controller 150 sets the time constant $T^{X2}$ to the previously set minimum time constant, and in machining with a rotating tool (for example, milling), the controller 150 may adjust the moving velocity in each axis direction, and set the time constant $T^{X2}$ to the same value as the time constant $T^{Ys}$.

While the main spindle rotates, the controller 150 sets the time constant $T^{X2}$ to the previously set minimum time constant. While the rotating tool provided in the turret 131 rotates without rotating the main spindle, the controller 150 may adjust the moving velocity in each axis direction, and set the time constant $T^{X2}$ to the same value as the time constant $T^{Ys}$.

The controller 150 may switch the time constant $T^{X2}$ in the movement in the X2 axis direction to the previously set minimum time constant or to the same value as the time constant $T^{Ys}$, and may adjust the moving velocity in each axis direction according to the information on the type of the holder that holds the tool to be attached to the turret 131.

More specifically, when the information on the type of the tool holder is a byte holder for machining external diameter or a byte holder for machining internal dimeter, the machining is meant to be the turning or grinding. In this case, the controller 150 sets the time constant $T^{X2}$ to the previously set minimum time constant. When the information is on the rotating tool unit, the machining is meant to be the machining with the rotating tool such as the milling. In this case, the controller 150 may adjust the moving velocity in each axis direction, and set the time constant $T^{X2}$ to the same value as the time constant $T^{Ys}$.

The turning or the machining with the rotating tool is determined in accordance with a machining mode for a machining operation. When a machining mode for the turning is set, the controller 150 sets the time constant $T^{X2}$ to the previously set minimum time constant. When a machining mode for the machining with the rotating tool is set, the controller 150 may adjust the moving velocity in each axis direction, and may set the time constant $T^{X2}$ to the same value as the time constant $T^{Ys}$.

What is claimed is:

1. A machine tool comprising:
   a spindle headstock movable in an X axis direction;
   a tool post that includes a movement axis in the X axis direction and a movement axis in a direction inclined to the X axis direction to intersect therewith, and is movable relative to the spindle headstock; and
   a controller that performs superposition control of movement of the tool post and movement of the spindle headstock, wherein
   the tool post is movable in a Y axis direction orthogonal to the X axis direction by combining movements along both of the movement axes, and
   the controller includes a regulator that regulates movement of the spindle headstock in the superposition control associated with movement of the tool post in the Y axis direction.

2. The machine tool according to claim 1, wherein the regulator regulates the movement of the spindle headstock in the superposition control by moving the spindle headstock with a movement amount in the superposition control in a direction opposite to a direction of the movement in the superposition control.

3. The machine tool according to claim 1, wherein the regulator regulates the movement of the spindle headstock in the superposition control by setting a position of a tool edge of a tool mounted on the tool post, which is moved in the superposition control, as a reference position of the spindle headstock in the superposition control.

4. The machine tool according to claim 1, comprising a moving device including a base movable in the X axis direction, a middle base that is provided on the base, and is movable in a direction of a Z axis orthogonal to the X axis direction and the Y axis direction, and a supporting base that is provided on the middle base and is movable in a direction inclined to the X axis direction to intersect therewith, wherein
   the tool post is provided on the supporting base of the moving device.

5. The machine tool according to claim 1, wherein when the tool post is moved in the Y axis direction, the controller sets time constants in the respective movement along both of the movement axes to a same value, and sets respective moving velocities along both of the movement axes to cancel the movement in the X axis direction by the movement in a same time.

6. The machine tool according to claim 5, wherein when the tool post is not moved in the Y axis direction, the controller sets the time constants in the movement of both of the movement axes to different values, respectively.

* * * * *